April 19, 1927.
J. A. O'NEILL
1,625,146
CUSHION DEVICE FOR AUTOMOBILES
Filed Jan. 19, 1926
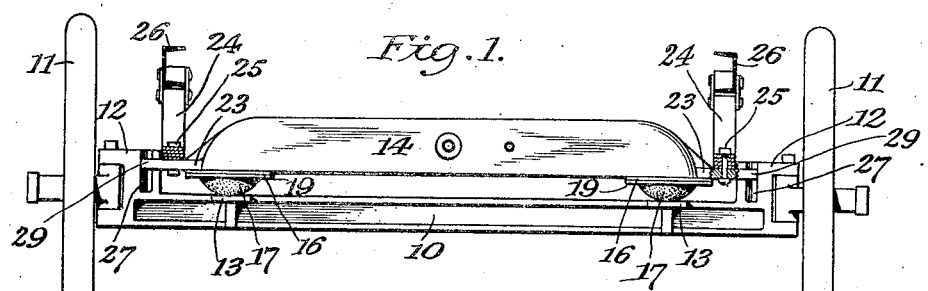
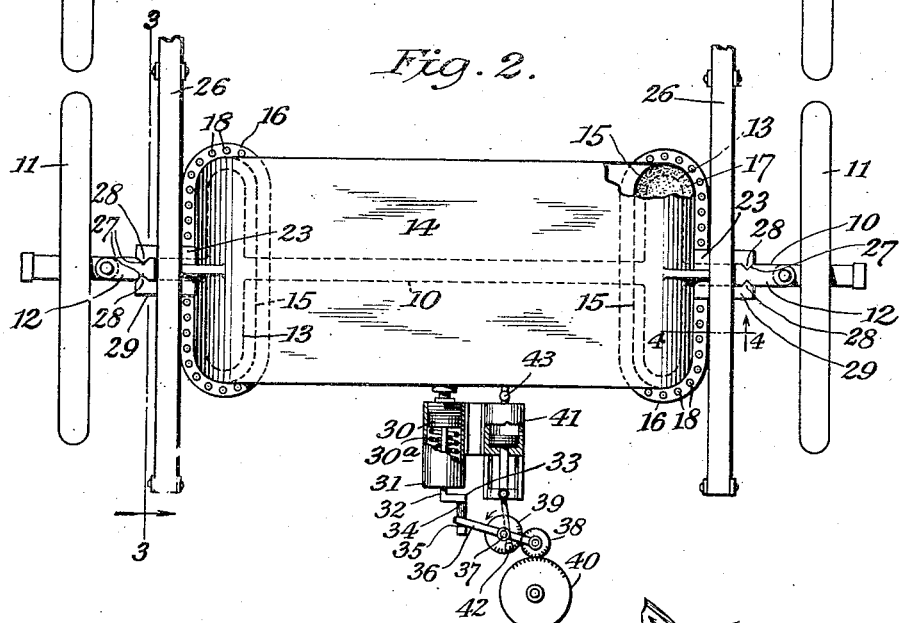
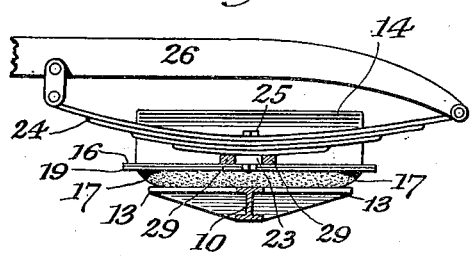
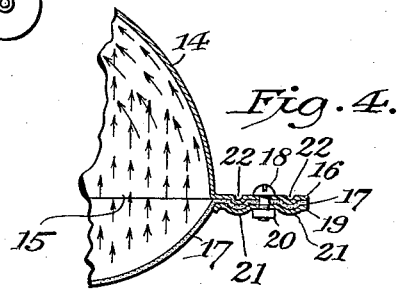
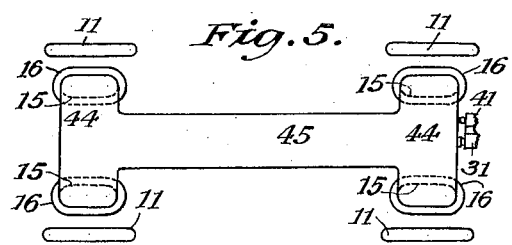
Inventor,
Joseph A. O'Neill,
By A. R. Appleman
Attorney.

Patented Apr. 19, 1927.

1,625,146

UNITED STATES PATENT OFFICE.

JOSEPH A. O'NEILL, OF NEW YORK, N. Y.

CUSHION DEVICE FOR AUTOMOBILES.

Application filed January 19, 1926. Serial No. 82,296.

This invention relates to cushion devices for automobiles, the object, broadly, is to do away with the usual pneumatic tires, to provide devices of the above class, whereby equal or greater riding comfort is afforded and to make it possib'e to employ solid tired wheels of any sort for economy.

A principal feature of my invention resides in the provision of compressed air drums preferably positioned over the axles and having extensions on which the springs of the chassis rest and the drums, on the underside at the ends, are provided with openings, which are closed by suitable air-proof flexible fabric or other material, providing a rounded cushion at each end which bear on laterally directed brackets on the axles.

Another feature of the invention is to shape the ends of the drums, over the load sustaining cushions, with inwardly curved walls of such contour to provide quick diverting or deflecting action of the upwardly directed load thrust air streams to guide them inwardly against the dormant or stagnant air at the center of the drums, which action provides for maximum resiliency which is transmitted to the chassis through the springs.

The well known theory acepted in tire construction, that the greater the air volume the greater the resiliency, is followed by me, in that my drums are of such size to contain an air volume greater than that contained in two ordinary tires, and further, it is recognized by tire experts, that greater resiliency would be obtained could the air at the load thrust point have freer circumferential movement around and upward against the still air in the upper part of the tire, but this is prevented by the large arc against which the air impinges.

In the drawings:—

Fig. 1 is an elevational view showing my cushion device arranged in operative position on an automobile axle.

Fig. 2 is a plan view of the device and also showing a preferred air pressure control mechanism.

Fig. 3 is a partial sectional side view on the line 3—3 of Fig. 2.

Fig. 4 is an enlarged detail section on the line 4—4 of Fig. 2.

Fig. 5 is a diagrammatic plan view of a modified form of my invention in which a unitary cushion device is provided to function at all four wheels of an automobile.

Referring to the drawings, the front axle of an automobile is shown at 10, on which solid tired wheels 11, are carried The axle at the ends, is formed with heads 12, and cross brackets 13, which support a metallic compressed air drum 14, which is provided with openings 15, in the bottom at the ends thereof which are surrounded by flanges 16, formed integral with the drum body.

I attain the desired cushioning effect on the chassis by employing a rubberized fabric or other strong air-proof flexible sheet material 17, to close the openings 15, and which is attached to the flanges 16, by screws or other devices 18, serving to secure clamp rings 19, in place The screws are preferably threaded into nuts 20, held against rotation by parallel beads 21, formed in said rings; similar registering beads or ribs 22, are formed on the flanges 16, to provide offset joints at the sides of the screws to effectively preclude escape of air from the drum 14, and black lead or other air-proofing substance may be applied to the opposite faces of the clamped fabric 17, at these joints to further seal the parts.

The drum 14, has end brackets 23, on which the usual springs 24, are made fast by a bolt 25, passing through a perforation in the said brackets, and these springs are adapted to support the usual chassis 26. The brackets may be welded, riveted or otherwise attached to the drum, or may be integrally formed therewith.

The heads 12, of the axles have vertical grooves 27, in each side to slidably receive guide lugs 28, formed on extensions or forks 29, of the brackets, to maintain the drum in proper relative position with the cross brackets 13, of the axle.

Air pressure is controlled by a spring controlled piston 30, working in a cylinder 31, communicating with the drum. The piston has a stem 32, carrying an extension 33, with two stops 34, and 35, between which is projected one end of a lever 36, swinging on a center 37, and carrying at its other end an idler gear 38, here shown in mesh with a gear 39, revoluble on the center 37, and a larger gear 40, driven by the generator of the car. This last named gear is continuously driven when the automobile engine is running, and when the pressure in the drum builds up to near a desired poundage, the piston 30, will be gradually forced outwardly against the springs 30ª, until the stop 34, contacts with lever 36, when the idler 38, will be withdrawn from gear 40, thus causing the air pump 41, linked to a crank pin 42, on the gear 39, to come to rest.

A check valve 43, is placed between the pump and air drum to hold the pressure, but should the pressure in the drum drop below the desired point, the springs 30ª, will force the piston 30, inwardly, causing the stop 35, to contact with the end of lever 36, and carry the idler 38, over into mesh with the generator driven gear to again start the pump 41, as will be readily understood by those skilled in the art.

Of course, it will be understood that a cushion device similar to the one above described will be disposed over the rear axle of the car in the same manner but with necessary changes in shape or form, the principle of action or operation being identical.

In Fig. 5 of the drawing I show a modified form of cushion device in which front and rear cross drums 44, are connected by an integral longitudinal drum 45, and by this construction I can carry a far greater volume of compressed air, insuring even greater resiliency than that afforded by the single drum device, and further, I provide a unitary structure for cushioning the chassis at the four wheels of the car.

What I claim is:—

1. The combination with the chassis, springs and axles of an automobile, of cushion devices arranged over the axles and under the body and extending from spring to spring, said devices comprising compressed air drums having end extensions to support the springs, curved end walls and air inflated cushions resting on said axles, and means for maintaining a constant air pressure in said drums.

2. The combination with the chassis, springs and axles of an automobile, of compressed air drums having projecting air inflated cushions resting on the axles inward of the springs and brackets on which the springs are carried, said drums also having upwardly and inwardly curved end walls, and means for maintaining a constant air pressure within the drums.

3. The combination with the chassis, springs and axles of an automobile, of compressed air drums arranged over the axles and under the body of the car and extending from spring to spring, means on said drums for supporting the springs, said drums also having inflated cushions resting on the axles and means for maintaining a constant air pressure in said drums.

4. The combination with the chassis, springs and axles of an automobile, of compressed air drums arranged under the car body between the springs and having cushions resting on said axles, said axles having guide grooves, said drums also having brackets to support the springs, and extensions to engage said grooves, together with curved end walls, for the purpose set forth.

5. In cushion devices for automobiles comprising compressed air drums arranged over the axles of the car and under the body thereof and having cushions which bear on said axles means on said drums for supporting the spring of the car, and for engaging said axles for guiding the vertical movements of said drums which are also provided with curved end walls for the purpose set forth.

6. In cushion devices for automobiles having the usual chassis, springs and axles, said axles having cross brackets and guide grooves near the opposite ends thereof, compressed air drums arranged over the axles and under the car body, said drums having inflated cushions resting on said axle brackets and end extensions to support the springs and to co-act with said grooves to guide the drums in their operative movements.

In testimony whereof I have signed my name to this specification this 24th day of October, 1925.

JOSEPH A. O'NEILL.